UNITED STATES PATENT OFFICE.

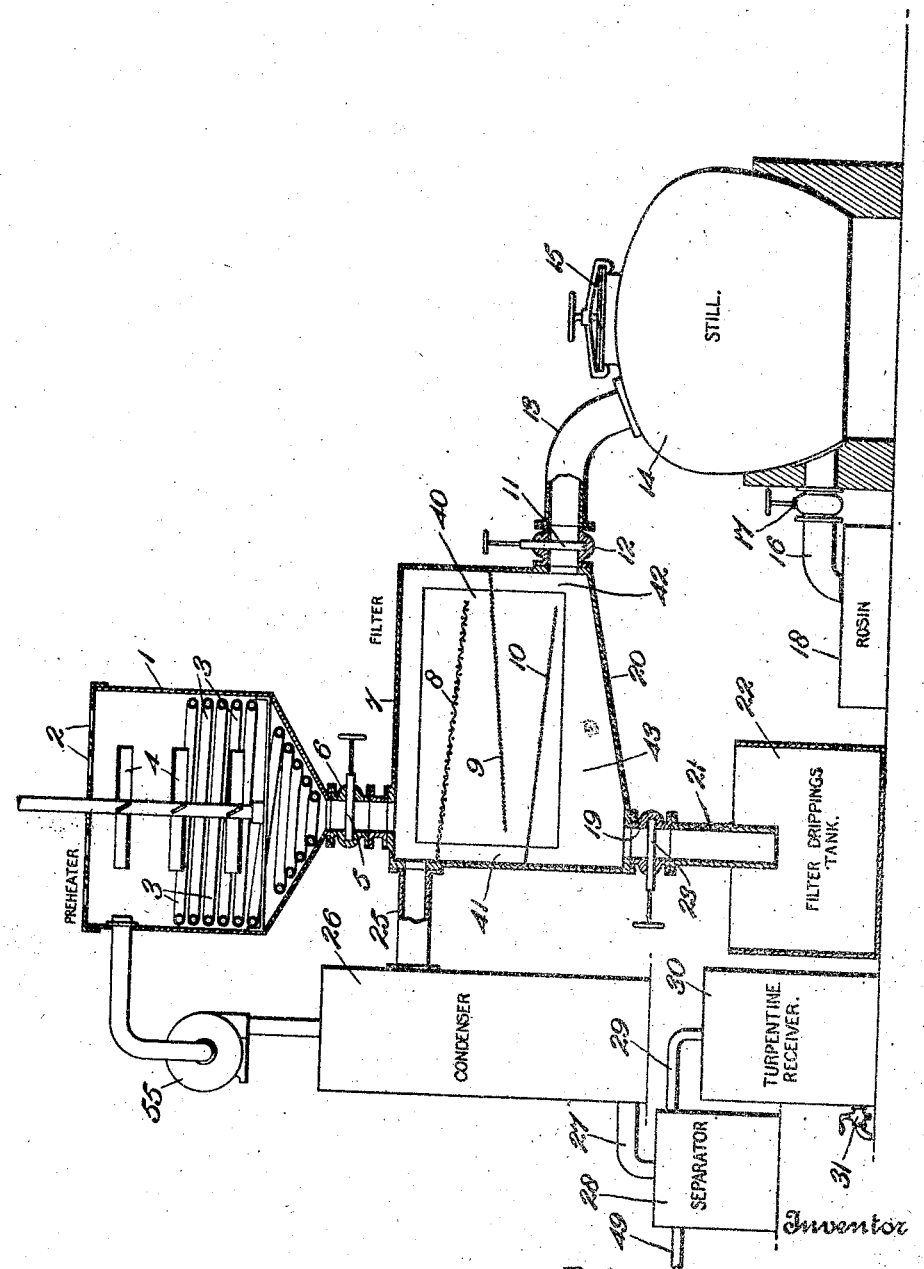

ROBSON DUNWODY, OF NEW ORLEANS, LOUISIANA.

PROCESS OF AND APPARATUS FOR DISTILLING CRUDE PINE-RESINS.

1,291,800.　　　Specification of Letters Patent.　　Patented Jan. 21, 1919.

Application filed January 12, 1918.　Serial No. 211,552.

*To all whom it may concern:*

Be it known that I, ROBSON DUNWODY, a citizen of the United States, residing at New Orleans, in the parish of Orleans and State of Louisiana, have invented certain new and useful Improvements in Processes of and Apparatus for Distilling Crude Pine-Resins; and I do hereby declare the following to be a full, clear, and exact description of the invention, such as will enable others skilled in the art to which it appertains to make and use the same.

This invention relates to a method of and an apparatus for distilling crude pine resins and has for its object to improve the methods and apparatus heretofore proposed.

With these and other objects in view the invention consists in the novel steps and combinations of steps constituting the process and in the novel parts and combinations of parts constituting the apparatus all as will be more fully hereinafter disclosed and particularly pointed out in the claims.

Referring to the accompanying drawing in which the figure is a diagrammatic view partly in section of an apparatus made in accordance with this invention, 1 indicates any suitable preheater for the resins provided with the openings 2, through which said resins may be introduced as by allowing the same to flow from the barrels containing the same, 3 any suitable preheating means such as a steam coil for example, 4 any suitable stirring apparatus, and 5 a valve controlling the connection 6 extending between the preheater 1 and the filtering apparatus 7. The said filtering or straining apparatus 7 preferably comprises a relatively coarse screen or strainer 8 having say one inch meshes made of wire cloth, a second screen or filter 9 having finer meshes say one fourth inch, also made of wire cloth, and a third screen or strainer 10 likewise made of wire cloth and having meshes made say one tenth of an inch in size, although any form of filter or centrifugal or other method of separating the dross from the gum may be used.

11 indicates a valve controlling a connection 12 between the filter 7 and passage or connection 13, leading to the still or kettle 14. The said still or kettle is provided with any suitable cover 15 and any suitable outlet 16 controlled by a valve 17. 18 represents any suitable receptacle for the rosin. 19 represents a connection leading from the inclined bottom 20 of the filter 7 to the pipe 21 leading into the drippings tank 22, and 23 reperesents any suitable valve for controlling the passage of material through said connection 19. 25 represents a connection from the upper portion of the filter 7, to the condenser 26, provided with the outlet 27 leading to the separator 28, and said separator is provided with a connection 29 leading to the turpentine receiver 30 provided with a valve controlled outlet 31 as shown.

The process is carried out as follows:—

The crude pine resins being introduced through the openings 2 of the preheater 1, and steam having been introduced into the coil 3, the temperature is brought up to a point not exceeding say 200° F., or to a point below the boiling and distillation temperature of the gum whereupon the said resin or gum is given a vigorous mechanical stirring through the means 4 and its lumps more or less broken up. The molten gum thus heated is next led through the connection 6 when it flows down along and over the relatively coarse screen 8, through the meshes of which a portion of said gum passes and is caught on the finer meshes of the screen 9. That portion of the gum which does not pass through the meshes of the screen 8 passes down over the end of said screen through the space 40 and thus reaches the screen 9. Another portion of the gum will pass through the meshes of the next coarser screen 9 and still another portion thereof will pass through the space 41 at the end of said screen 9 whereupon the molten gum will reach the screen 10 and pass through its meshes, filling up the space 43 above the inclined bottom 20. Stated in other language, the gum as it enters the filter 7 is in the form of a viscous, sticky, liquid but thin enough to flow rather freely, so that it quickly passes through the screens to the space 43, and on into the kettle or still 14. Accordingly, although the temperature is somewhat higher than in the preheater 1, yet, these first runnings of the gum have not been subjected to this higher temperature for a time sufficiently long to bring out the stains to any great extent. It results that substantially all the discoloring material remains behind with the foreign matter which adheres to the screens, and a very high grade of gum is separated out and passed into the still 14, for the valve 23 being closed the gum filling the space 43 cannot escape through the connection 19, and therefore, the cleaner uncolored, unstained and purer portions of the gum will fill the connection 12 and the valve 11 being opened it will pass through the connection 13 into the still 14. In the meantime, the woody particles, sand, dirt, and other refractory lumps of gum, etc., deposited on the various screens 8, 9, and 10, and the gum associated therewith is recovered in a manner to be disclosed below.

When a sufficient amount of substantially pure unstained, uncolored gum has been thus deposited in the still 14, the valve 5 is closed and the valve 23 is opened. The still being fired up the distillate consists of spirits of turpentine and an acid water known in the trade as low wine, there being other oils and impurities present in minor quantities. The vapors of this distillate will now pass through the filter box 7 and through the screens 10, 9 and 8 containing the above mentioned impurities and said vapors will pass on through the connection 25 into the condenser 26. The vapors of said distillate being condensed in the condenser 26 they are led through the connection 27 into the separator 28, where the low wine is permitted to go to waste through the connection 49 and the turpentine is led through the connection 29 to the receiver 30. In the meantime, the said hot vapors of low wine and turpentine quickly dissolve all the resins or gum from the impurities resting upon the screens 8, 9 and 10, and they further dissolve any refractory lumps that may rest thereon. The said dissolved gum now trickles down and reaches the space 43 and is led from time to time into the filter drippings tank 22 by opening the valve 23 and thus only the unstained substantially pure material is allowed to enter the still 14. In fact the materials collected at the bottom of the space 43 and passing the valve 23 will be found to contain substantially all the coloring matter that has been extracted from the chips and other impurities carried by the gum and thus the material that passes into the still 14 will be substantially free from all coloring matter, which would not be the case if no sloping bottom 20 were provided. That is to say, although this said sloping bottom does not collect the stained portions of the gum during the first runnings of unstained gum, yet, it does collect the sand, dirt and other heavy and small particles of foreign matter which pass the filters during the early stages of the process and thus prevents this material from contaminating the high grade gum in the still 14.

When the distillation process has been completed in the still 14 the valve 17 is opened and the residue in the kettle, which is commercial rosin, is led into the filter or rosin receptacle 18. The rosin is conveniently drawn from said receptacle 18 by any suitable connection not shown into barrels ready for shipping. The dry skimmings left in the filter box 7 on the screens 8, 9 and 10 may now be removed and destroyed. When sufficient gum has been collected in the drippings tank 22 to make a charge it may be independently distilled.

It will now be clear that by following the process outlined instead of following the processes heretofore employed, I am able to segregate with celerity and certainty, all the foreign matter that is generally collected with the crude material and which causes considerable loss in the quality of the product. That is to say, under the method of distillation prior to this invention, the crude gum is generally poured into an ordinary pot still where it is heated slightly and skimmed to remove as much of the bark, woody particles, and other impurities associated with the gum as it is possible to do so.

But in this skimming operation of course, these woody particles, etc., are saturated with gum and also the gum is associated with more or less refractory lumps of gum or scrape that are likewise skimmed out. All of these skimmings containing often a large percentage of good valuable gum are generally thrown away, and therefore, they entail a considerable loss which is avoided by following the above process.

In addition to this, there is a considerable loss of turpentine vapors escaping from the still during the skimming process, while in the process disclosed above, the still and the other apparatus being closed, no such loss occurs. Not only in the prior processes are the above losses of material experienced, but the chips, bark, straw, etc., with which the crude gum is generally associated has the effect during the distillation process of staining the rosin and thus causing it to be sold in the market at a much lower grade than it would be sold at, if said stains did not exist.

By my process, on the other hand, it will be observed that owing to the separating out of the colored or stained portion of the gum from the unstained portion, I am enabled to produce a much higher grade of rosin than would otherwise be possible. Not only does the staining of the rosin thus lower its grade, but these foreign materials sometimes accumulate in the kettle in such heavy layers as to make the heating of the mass quite difficult to control and therefore a scorching of the charge is often experienced and thus the rosin is still further lowered in grade while a still further loss of time and material is entailed. It will thus be seen that my process avoids these last mentioned objections also. Again, even with a most careful skimming of the material, as now practised, it is impossible to remove all the chips, bark, straw, etc., and it is further impossible to remove any substantial portion of the sand, dirt, fine particles of charcoal, etc. By my process, as above stated, these objections are entirely avoided.

It is true that efforts have been heretofore made to filter the crude gum before putting it into the still, but so far as I am aware, they have all been failures commercially in that when they removed the chips, dirt, etc., mentioned above, they also removed the refractory hard lumps or so called resin acid crystals or scrape along with said chips, etc., and thus entailed a heavy loss which is not experienced in my process.

It has been further proposed to collect the skimmings consisting of gum or rosin saturated chips, bark, dirt, resin, acid crystal scrape, etc., saturated with gum and to separately treat the same to recover the valuable products present, but all such processes, in so far as I am aware have been commercial failures in that where this has been tried at the distillery, steaming or other process was used that was unsuccessful. Or when an effort was made to treat these at some central plant equipped with more efficient apparatus, such as solvent process, the cost of transportation and collection has been so great as to eat up all p fits in the procedure and therefore the practical man has found it best to simply let such skimmings go to waste. By my process on the other hand, substantial profits are easily obtained by treating these impurities at the distillery. An important feature of this invention resides in the fact that these said gum lumps, scrape skimmings, etc., are treated with the hot vapors of distillation. These said vapors readily dissolves out the gum present on the skimmings without entailing any loss at all when my process is involved while with the other processes heretofore proposed not only has the dissolving action been imperfect but it has also entailed a considerable loss of material.

It will therefore be seen that by following the above mentioned process I subject the crude gum as it comes from the trees and which is associated with more or less quantities of chips, bark, charcoal, sand, dirt, scrape or refractory lumps of gum, etc., to a preheater and to a mechanical stirring or agitation which serves to uniformly mix the material and to break up and to dissolve up as much as possible the said gum crystals, or refractory lumps. Second I separate out these impurities and refractory portions of the gum.

Third I next subject the strained and unstained gum to a distilling action and utilize the vapors of the distillate to dissolve the gum and the refractory lumps of gum and resin acid crystals out of the skimmings whereupon the said vapors also pass on through the condenser and into the separator 28 where the low wine and water portions of the distillate are separated from the turpentine portions and the turpentine is finally recovered in the tank 30. In the meantime it will be observed that the gum recovered from the skimmings and which is discolored from stains and impurities is collected for separate treatment or distillation at convenience.

The heating action in the preheater 1 is liable to give off more or less vapors of turpentine and I prefer to interpose a suction fan 55 or some other means between said preheater 1 and the condenser 26 in order to deliver such vapors into said condenser, but of course, this said fan 55 is not essential in all cases.

Fourth it will be observed that by thus separating the stained or colored portions of the gum from the unstained or uncolored portions thereof, I am enabled to produce a rosin which is classified in a higher commercial grade than would otherwise be possible, while at the same time by recovering the rosin and the turpentine from the dross I avoid any loss of material. The whole apparatus constituting a closed system there is a minimum loss of material.

It is obvious that those skilled in the art may vary the details of the process as well as the details of the construction and arrangement of parts without departing from the spirit of the invention and therefore, I do not wish to be limited to the above disclosure except as may be required by the claims.

What I claim is:—

1. The steps in a process of producing turpentine and rosin from crude gum materials which consists in preheating said materials; agitating said preheated materials to produce a more uniform mixture and to partially break up any refractory lumps that might exist; suitably straining or filtering said preheated and agitated materials; separating the colored or stained material from the portions not colored; subjecting the uncolored portions of said strained material to a distilling action; and causing the vapors of distillation to pass through the residue to dissolve out any gum that may be present therein; substantially as described.

2. The process of producing turpentine and rosin from crude gums which consists in melting and stirring said gum; then passing said melted gum through a strainer or filter; automatically separating the unstained from the stained portions of said gum; distilling the gum to separate out the rosin present; passing the vapors of the distillate through the material left on the said strainer to dissolve out any gum present; condensing said vapors; and separating out the turpentine present, substantially as described.

3. The process of producing turpentine and rosin from crude gum which consists in passing said gum through a plurality of strainers of different mesh; separating the unstained from the stained portions of the gum; distilling the unstained portion of said gum to separate out its rosin; passing the vapors of the distillate through said strainers to dissolve any gum present; and adding the dissolved gum thus obtained to the ained portions of the gum, substantially as described.

4. The process of producing turpentine and rosin from crude gum which consists in passing said gum through a plurality of strainers of different mesh; separating the stained from the unstained portions of the gum; distilling one of said portions to separate out its rosin; passing the vapors of the distillate through said strainers to dissolve any gum present; adding the dissolved gum thus obtained to the stained portions of the gum; and recovering the turpentine from both the stained and unstained portions of said gum, substantially as described.

5. In an apparatus for distilling crude gum the combination of a preheater; a filter connected to said preheater and having an inclined bottom; a still having its vapor outlet connected to said filter near the highest point of said bottom; a condenser connected to said filter near its top; a separator connected to said condenser; and a turpentine receiver connected to said separator the whole so arranged that the stained portions of the gum may be separated from the unstained portions thereof, and the vapors from said still may pass through and dissolve the gum left in said filter, substantially as described.

6. In an apparatus for distilling crude gum the combination of a preheater; a filter provided with a screen and an inclined bottom below said screen connected to said preheater; a still connected to said filter above said inclined bottom and below said screen; and a condenser connected to said filter above said screen, whereby the vapors from said still may pass through and dissolve the gum left on said screen and whereby solids and other impurities are collected on said inclined bottom, substantially as described.

7. In an apparatus for distilling crude gum the combination of a preheater; a filter connected to said preheater and having an inclined bottom; a drippings tank connected to said inclined bottom at its lowest point; a still connected to said filter near the highest point of said bottom; a turpentine receptacle; a condenser; a separator; a connection between the bottom of said condenser and said separator; a connection between said turpentine receptacle and said separator; and a connection between the top portion of said condenser and said filter, whereby the vapors from said still may pass through and dissolve the gum left in said filter, substantially as described.

In testimony whereof I affix my signature, in presence of two witnesses.

ROBSON DUNWODY.

Witnesses:
M. W. SHERWOOD,
T. C. FRAIM.